March 21, 1961 D. A. DURRETT III 2,975,645
GEARLESS TRANSMISSION
Filed July 27, 1959 2 Sheets-Sheet 1

INVENTOR.
Devereaux A. Durrett III
BY
Jennings, Carter & Thompson
Attorneys

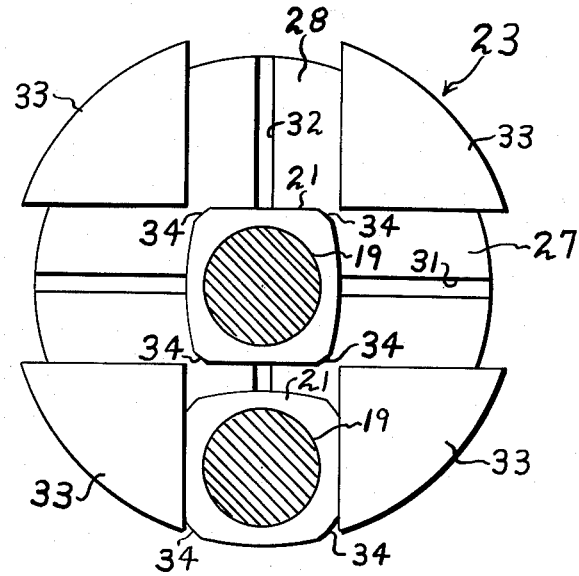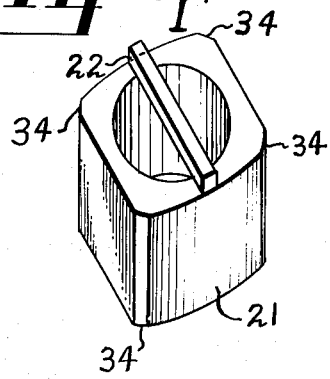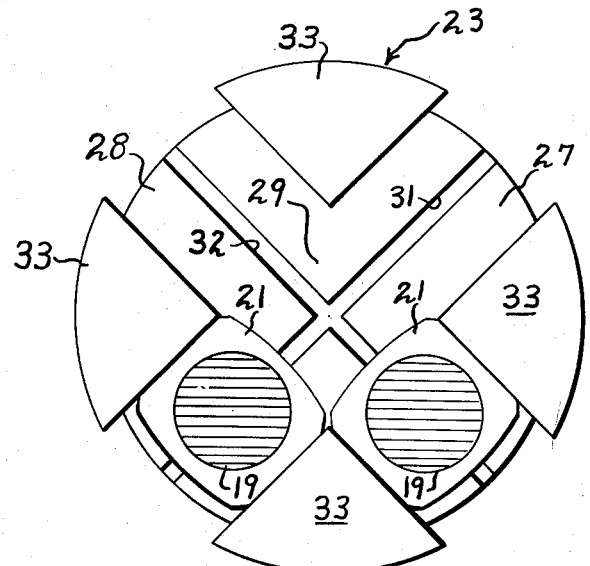

United States Patent Office 2,975,645
Patented Mar. 21, 1961

2,975,645

GEARLESS TRANSMISSION

Devereaux A. Durrett III, Rte. 1, Box 419,
Montgomery, Ala.

Filed July 27, 1959, Ser. No. 829,805

3 Claims. (Cl. 74—69)

This invention relates to a gearless transmission and more particularly to such a transmission in which a disc on a driving shaft is provided with driving pins to engage guideways in a disc on a driven shaft.

Heretofore it has been common to drive a shaft through two facing discs, one of which has driving pins thereon and is secured to the driving shaft, and the other of which has guideways therein receiving the pins and is secured to the driven shaft whereby upon rotation of the driving shaft the driven shaft is rotated through the driving pins and the discs. In the prior art apparatus, the driving pins have been of a relatively small diameter in comparison to the diameter of the discs. This has resulted in the shearing of the driving pins in some instances, especially where heavy loads have been encountered.

The present invention provides an arrangement in which the driving pins are of a relatively large diameter in comparison to the diameter of the disc and bearing sleeves are mounted on the pins for relative rotation and for sliding movement within guideways on the disc of the driven shaft. The bearing sleeves are of a generally square cross section and have beveled corners to permit the pins to be spaced closely to each other while being of a relatively large diameter.

It is an object of the present invention to provide a gearless transmission in which discs are provided on the adjacent ends of a driving shaft and a driven shaft with a pair of driving pins having sleeves thereon positioned on the driving shaft disc and crossed guideways to receive the driving pins and bearing sleeves positioned on the driven shaft disc. The bearing sleeves are of a generally square cross section with beveled edges to allow close spacing of the driving pins, and the driving pins are formed of a relatively large diameter in comparison to the disc diameter to provide greater strength in the coupling between the driving and the driven shafts.

It is a further object of the invention to provide a gearless transmission in which grooves are provided in the inner surface defining the guideways on the driving shaft disc and keys are formed on the inner surface of the bearing sleeves to engage in sliding relation the grooves whereby the pins are held in position by the keys when the pins pass the common intersecting portion of the crossed guideways.

Apparatus embodying features of my invention is illustrated in the accompanying drawings forming a part of this application in which:

Fig. 2 is a sectional view taken generally along the line 2—2 of Fig. 1 and showing the disc on the driven shaft with driving pins engaging guideways in the disc;

Fig. 3 is a sectional view similar to Fig. 2 but showing the driving pins in a different position from that shown in Fig. 2, the bearing sleeve in Fig. 3 being shown as projecting into the intersecting central portion of the guideways; and, Fig. 4 is a perspective view of a bearing sleeve which is adapted to fit around a driving pin and showing a key on an end thereof.

Figure 1:
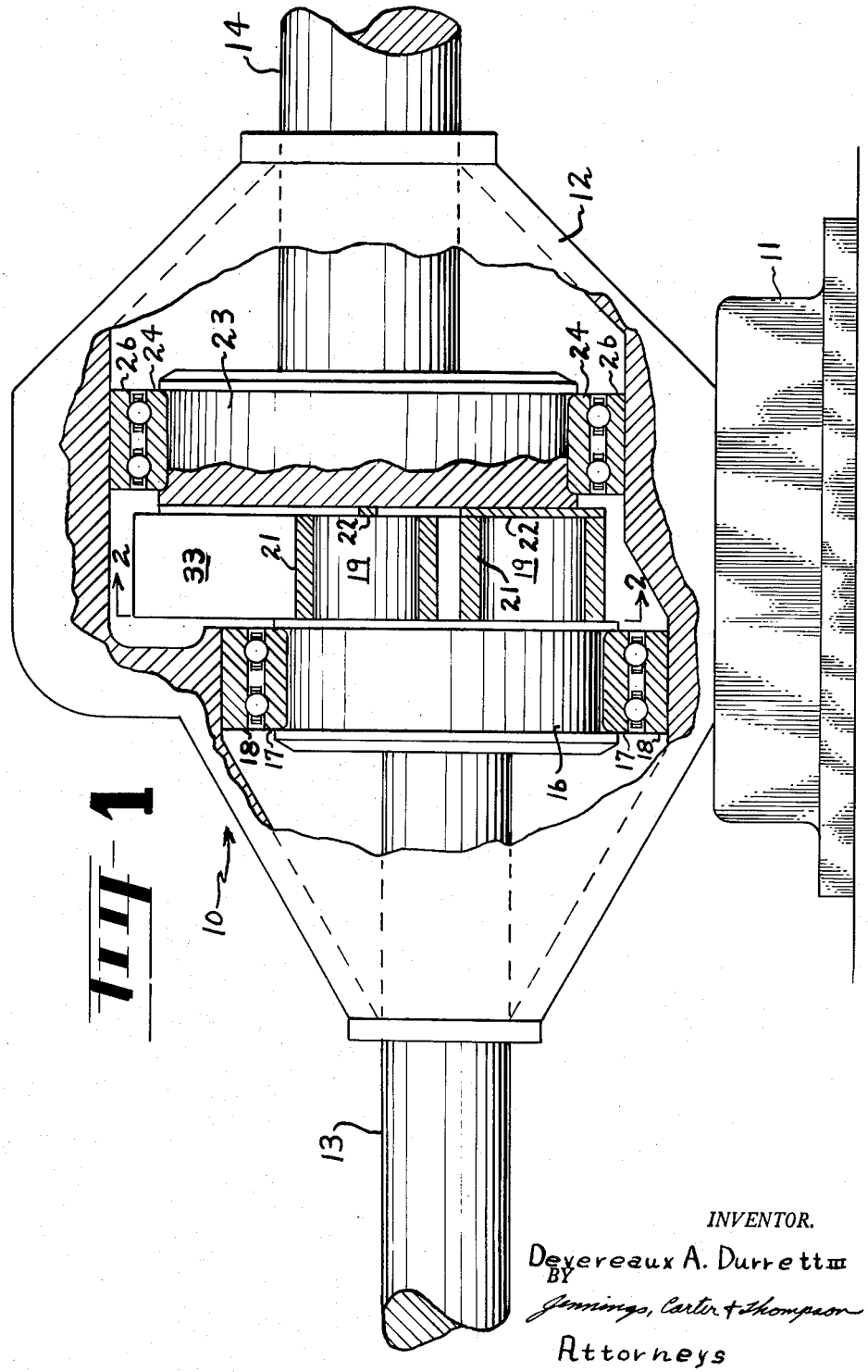
Fig. 1 is an elevational view of my gearless transmission with certain parts broken away and showing discs on the adjacent facing ends of a driving shaft and a driven shaft.

Referring now to the drawings for a better understanding of my invention, I show in Fig. 1 my gearless transmission indicated generally by the numeral 10 mounted on a base 11 and having a housing 12 surrounding the working elements of my transmission. A driving shaft 13 which is driven from a suitable source of power such as a motor (not shown) is provided at one end of housing 12 and a driven shaft 14 extends from an opposite end of housing 12. A disc 16 is secured to the end of shaft 13 within housing 12 and is mounted in ball bearings comprising an inner race 17 and an outer race 18.

A pair of driving pins 19 is secured to the outer surface of disc 16 and bearing sleeves 21 are positioned about pins 19 so that pins 19 may rotate relative to sleeves 21. Bearing sleeves 21 have keys 22 on the outer end thereof as shown in Figs. 1 and 4.

A disc 23 is secured to an end of driven shaft 14 and faces disc 16 on driving shaft 13. Disc 23 is mounted in ball bearings comprising an inner race 24 and an outer race 26. As shown in Figs. 2 and 3, disc 23 has a pair of guideways 27 and 28 disposed at right angles to each other and intersecting at the center of disc 23. The intersecting guideways 27 and 28 form a common portion 29 through which both driving pins 19 and bearing sleeves 21 pass during the operation of my transmission. Guideways 27 and 28 form segments 33 which project from the face of disc 23 and engage the sides of bearing sleeves 21 to guide the driving pins 19.

Grooves 31 and 32 are provided centrally of guideways 27 and 28, respectively, to receive the keys 22 on bearing sleeves 21 and thereby aid in guiding driving pins 19 and sleeves 21. Keys 22 are required to guide sleeves 21 when driving pins 19 pass through center portion 29 since sleeves 21 are not in contact with the sides of disc 23 at this position. As shown in Fig. 2, when pins 19 and driving sleeves 21 are in common center portion 29, one of the bearing sleeves 21 is not in supporting contact with any of sectors 33 and thus, key 22 holds sleeve 21 and pin 19 in position. The bearing sleeves 21 are formed of a generally square cross section so that a very compact gearless transmission may be provided. The corners of bearing sleeves 21 are bevelled as at 34 which allow both bearing sleeves 21 to project into the common center portion 29 simultaneously as shown in Fig. 3. Thus, a very close working relation is obtained between the two pins 19 and the distance between the pins 19 may be relatively small while pins 19 are of a relatively large diameter in comparison to the diameter of disc 23.

Pins 19 are preferably formed of a diameter more than one-half the diameter of bearing sleeves 21. The bearing sleeves 21 are also formed of a relatively large thickness in comparison to the diameter of disc 23 and are preferably formed of a thickness between 20% and 30% of the diameter of disc 23 whereby a close working relation between driving pins 19 and disc 23 is obtained. By providing such an arragement, pins 19 being of a relatively large diameter are adapted to carry heavy loads without the danger of shearing and disc 23 may yet be of a relatively small diameter to provide a small compact transmission with a resultant decreased cost in manufacture.

The distance between the center line of one bearing sleeve 21 and the outer edge of the other bearing sleeve 21 is equal to the distance between the outer surface of disc 23 and the center line of disc 23 so that a two-forone ratio is provided between driven shaft 14 and driving shaft 13. The beveled corners 34 of sleeves 21 are preferably struck on a radius that is equal to one-half the distance between the centerlines of pins 19 less a few thousands of an inch for clearance purposes, for example, thousandths of an inch for clearance purposes, for example, on the order of three thousandths of an inch.

From the foregoing, it will be seen that I have provided a gearless transmission in which driving pins 19 of a relatively large diameter are provided and bearing sleeves 21 of a generally square cross section are fitted about driving pins 19 and have beveled corners 34 to allow sleeves 21 to project simultaneously into a central center portion formed by the intersecting guideways. This allows for a very close tolerance between driving pins 19 and allows driving pins 19 to be spaced a relatively short distance from each other. Bearing sleeves 21 do not bear against segments 33 when they pass through common central portion 29 but are held in position by keys 22 which slidably engage the grooves.

While I have shown my invention in but one form, it will be obvious to those skilled in the art that it is not so limited but is susceptible of various changes and modifications without departing from the spirit thereof, and I desire, therefore, that only such limitations be placed thereupon as are specifically set forth in the appended claims.

What I claim is:

1. In a gearless transmission, a driving shaft and a driven shaft having adjacent facing ends, a disc secured to the adjacent facing ends, a disc secured to the adjacent ends of each of said shaft, a pair of spaced driving pins extending from the disc on said driving shaft, a freely rotatable bearing sleeve fitted about each of said pins, a pair of intersecting guideways positioned at right angles to each other on the disc of said driven shaft and receiving the pins and bearing sleeves of the driving shaft, said bearing sleeves being of a generally square cross section and having beveled corners, the thickness of said bearing sleeves being equal substantially to the width of said guideways, said guideways having a common center portion on the disc of the driven shaft which is substantially equal in area to the cross sectional area of a bearing sleeve, and said bearing sleeves both projecting into said common center portion at one position thereof with a beveled edge on one bearing sleeve facing and positioned closely adjacent a beveled edge on the other bearing sleeve.

2. In a gearless transmission, a driving shaft and a driven shaft having adjacent facing ends, a disc secured to the adjacent end of said shafts, a pair of spaced driving pins extending from the disc on said driving shaft, a freely rotatable bearing sleeve fitted about each of said pins, a pair of intersecting guideways positioned at right angles to each other on the disc of said driven shaft and receiving the pins and bearing sleeves of the driving shaft, each of said guideways having a groove positioned centrally therein and extending the length of the respective guideway, one end of each of said bearing sleeves having a key thereon in sliding engagement with one of the grooves to hold the bearing sleeves in alignment, said bearing sleeves being of a generally square cross sectional area and having beveled corners, the thickness of said bearing sleeves being equal substantially to the width of said guideways, said grooves having a common center portion on the disc of said driven shaft which is substantially equal in area to the cross sectional area of the bearing sleeves, and said bearing sleeves both projecting into said common center portion at one position thereof with a beveled edge on one bearing sleeve facing and positioned closely adjacent a beveled edge on the other bearing sleeve.

3. The transmission defined in claim 2 in which the diameter of said pins is greater than one half the diameter of said bearing sleeves whereby relatively large pins are employed, and said bearing sleeves are of a thickness between 20% and 30% of the diameter of said disc on the driven shaft.

References Cited in the file of this patent

UNITED STATES PATENTS

| | | |
|---|---|---|
| 1,753,927 | Higbee | Apr. 8, 1930 |
| 2,286,694 | Talbot | June 16, 1942 |

FOREIGN PATENTS

| | | |
|---|---|---|
| 135,234 | Germany | Nov. 13, 1901 |
| 477,330 | Great Britain | Dec. 29, 1937 |